(12) United States Patent
Walters et al.

(10) Patent No.: US 10,825,073 B1
(45) Date of Patent: Nov. 3, 2020

(54) SYSTEMS AND METHODS FOR CASUAL SPENDING RECOMMENDATIONS TO MODIFY CUSTOMER SPENDING

(71) Applicant: Capital One Services, LLC, McLean, VA (US)

(72) Inventors: Austin Walters, Savoy, IL (US); Jeremy Goodsitt, Champaign, IL (US); Fardin Abdi Taghi Abad, Seattle, WA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/505,037

(22) Filed: Jul. 8, 2019

(51) Int. Cl.
| | |
|---|---|
| *G06Q 30/00* | (2012.01) |
| *G06Q 30/06* | (2012.01) |
| *G06F 16/901* | (2019.01) |
| *G06N 7/00* | (2006.01) |
| *G06N 20/00* | (2019.01) |
| *G06Q 40/06* | (2012.01) |
| *G06Q 30/02* | (2012.01) |
| *G06Q 40/08* | (2012.01) |
| *G06Q 40/02* | (2012.01) |

(52) U.S. Cl.
CPC ..... *G06Q 30/0631* (2013.01); *G06F 16/9024* (2019.01); *G06N 7/005* (2013.01); *G06N 20/00* (2019.01); *G06Q 30/0202* (2013.01); *G06Q 30/0241* (2013.01); *G06Q 30/0252* (2013.01); *G06Q 40/02* (2013.01); *G06Q 40/06* (2013.01); *G06Q 40/08* (2013.01)

(58) Field of Classification Search
CPC ........ G06Q 40/00; G06Q 40/02; G06Q 40/08; G06Q 40/06; G06Q 30/0252; G06Q 30/0241; G06Q 30/02; G06Q 30/0202; G06Q 30/0631; G06N 7/005; G06N 20/00; G06F 16/9024
USPC ...................................................... 705/26, 27
See application file for complete search history.

(56) References Cited

U.S. PATENT DOCUMENTS

| | | | |
|---|---|---|---|
| 7,427,021 B2* | 9/2008 | Kemper | G06Q 20/401 235/380 |
| 8,447,687 B2* | 5/2013 | Ogrodski | G06Q 10/10 705/30 |
| 8,768,801 B1* | 7/2014 | Cheatham | G06Q 40/00 705/30 |

(Continued)

OTHER PUBLICATIONS

"Discover rolls out freeze feature," Chicago Tribune [Chicago, Ill] Apr. 17, 2015: 2; Dialog #1673730364, 3pgs. (Year: 2015).*

*Primary Examiner* — Robert M Pond
(74) *Attorney, Agent, or Firm* — Pillsbury Winthrop Shaw Pittman LLP

(57) ABSTRACT

A system for providing spending recommendations to a user. The system may include at least one memory unit storing instructions and at least one processor configured to execute the instructions to perform operations. The operations may include receiving first user shopping data based on a plurality of user shopping purchases over a first time period; determining, based on a statistical model, at least one of a temporal or a geographic trigger of the user shopping purchases; displaying a message to the user indicating the trigger; adding a rule to the statistical model based on user input; and displaying a f personalized spending recommendation, based on the rule.

8 Claims, 7 Drawing Sheets

(56) References Cited

U.S. PATENT DOCUMENTS

| | | | |
|---|---|---|---|
| 2002/0099649 A1* | 7/2002 | Lee | G06Q 20/4016 705/38 |
| 2002/0169720 A1* | 11/2002 | Wilson | G06Q 20/10 705/44 |
| 2010/0250411 A1* | 9/2010 | Ogrodski | G06Q 10/10 705/30 |
| 2011/0213684 A1* | 9/2011 | Tait | G06Q 20/10 705/30 |
| 2014/0046816 A1* | 2/2014 | Avari | G06Q 40/02 705/35 |
| 2015/0269582 A1* | 9/2015 | Simmons | G06Q 20/202 705/21 |
| 2016/0189151 A1* | 6/2016 | He | G06Q 20/401 705/75 |
| 2017/0011401 A1* | 1/2017 | Steinlicht | G06Q 20/405 |
| 2017/0053208 A1* | 2/2017 | Krishnamurthy | G06N 5/022 |
| 2018/0276670 A1* | 9/2018 | Ali | G06Q 20/4093 |
| 2019/0188788 A1* | 6/2019 | Baker, IV | G06Q 40/00 |

\* cited by examiner

SYSTEMS AND METHODS FOR CASUAL SPENDING RECOMMENDATIONS TO MODIFY CUSTOMER SPENDING

TECHNICAL FIELD

The disclosed embodiments generally relate to systems and methods for providing casual spending recommendations to a user, and more particularly, to using statistical optimization techniques to evaluate contemporaneous spending recommendations and modify future user spending behavior.

BACKGROUND

Many retail consumers spend too much money on goods or services, with respect to their income. As an example, some customers may become addicted to shopping or spend too much money on coffee or fast-food restaurants. Other consumers fail to spend according to their means or tend to make purchases at inopportune times, including for example, when goods or services are priced at their highest. As a result, many consumers may desire to reduce their spending and to receive assistance in managing their purchasing decisions. On the other hand, some thrifty consumers may want to know when it is acceptable for them to increase their spending and to make additional purchases.

While many smartphones provide a virtual wallet application, such applications typically do not provide real-time spending recommendations. Further, where spending recommendations are included, the spending recommendations are often static and are not targeted to specific users. As a result, recommendations to either decrease or increase spending may not be timely or may fail to benefit the specific user, especially when the recommendations fail to take into account an individual user's spending patterns or profile. Moreover, existing solutions fail to provide for real-time data collection and analysis to provide dynamic, targeted spending recommendations customizable to a user.

Accordingly, what is needed is a system or tool that provides model-based statistical optimization techniques and real-time messaging to either deter or encourage spending for particular users based on particular features, including for example, when certain users are located in proximity to certain merchants or during a particular time of day. Also needed is a system or tool that evaluates historical spending data for particular users and tailors personalized messages to targeted users to monitor and control user spending, based on historical spending and other real-time triggers.

The disclosed online system for providing causal spending recommendations to avoid or increase customer spending may address one or more of the problems set forth above and/or other problems in the prior art.

SUMMARY

One aspect of the present disclosure is directed to a system for providing spending recommendations to a user. The system may include at least one memory unit storing instructions and at least one processor configured to execute the instructions to perform operations. The operations may include receiving first user shopping data based on a plurality of user shopping purchases over a first time period; determining, based on a statistical model, at least one of a temporal or a geographic trigger of the user shopping purchases; displaying a message to the user indicating the trigger; adding a rule to the statistical model based on user input; and displaying a personalized spending recommendation, based on the rule.

Another aspect of the present disclosure is directed to a computer-implemented method for providing spending recommendations to a user. The method may include receiving first user shopping data based on a plurality of user shopping purchases over a first time period; determining, based on a statistical model, at least one of a temporal or a geographic trigger of the user shopping purchases; displaying a message to the user indicating the trigger; adding a rule to the statistical model based on user input; and displaying a personalized spending recommendation, based on the rule.

Yet another aspect of the present disclosure is directed to a non-transitory computer-readable medium storing instructions that, when executed by a processor, cause the processor to perform operations. The operations may include receiving first user shopping data based on a plurality of user shopping purchases over a first time period; determining, based on a statistical model, at least one of a temporal or a geographic trigger of the user shopping purchases; displaying a message to the user indicating the trigger; adding a rule to the statistical model based on user input; and displaying a personalized spending recommendation, based on the rule.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Reference will now be made in detail to the disclosed embodiments, examples of which are illustrated in the accompanying figures. The disclosed systems and methods relate to providing one or more spending recommendations to a user.

Figure 1:
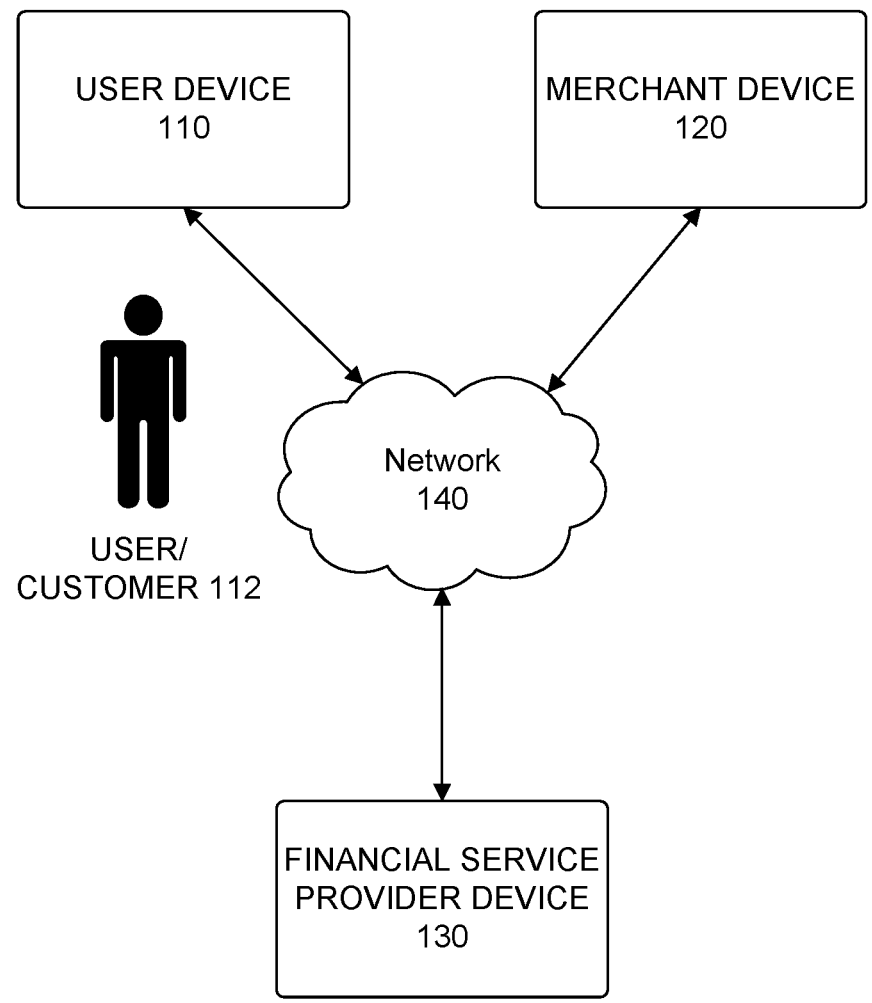
FIG. 1 is a block diagram of an exemplary system for providing spending recommendations to a user, consistent with disclosed embodiments.

FIG. 1 is a block diagram illustrating an exemplary system 100, consistent with disclosed embodiments that may be configured for providing one or more spending recommendations to a user consistent with disclosed embodiments. As shown, system 100 includes a user device 110, a merchant device 120, and a financial service provider device 130, all of which are communicatively coupled by a network 140. While only one user device 110, merchant device 120, and financial service provider device 130 are shown, it will be understood that system 100 may include more than one user device 110, merchant device 120, and/or financial service provider device 130. The components and arrangement of the components included in system 100 may vary.

Each of devices 110-130 may include a computing system configured to provide, use, and/or process user data and location data. As further described herein, devices 110-130 may include one or more computing devices (e.g., computer(s), server(s), embedded systems), memory storing data and/or software instructions (e.g., database(s), memory devices. In some embodiments, the one or more computing devices are configured to execute software instructions stored on one or more memory devices to perform operations consistent with the disclosed embodiments. Each of devices 110-130 may be configured to communicate with one or more of devices 110-130. In certain aspects, users may operate one or more of devices 110-130 to initiate operations consistent with the disclosed embodiments. For example, user device 110 may be operated by user 112. User 112 may be an owner/operator of user device 110, such as a user of one or more entities associated with devices 120 and 130. In other aspects, users may be employees of, or associated with, the entity corresponding to devices 120 and/or 130 (e.g., someone authorized to use the underlying computing systems or otherwise act on behalf of the entity). In other aspects, the users may not be employees or otherwise associated with the underlying entity. In some aspects, the users may entities, rather than individuals, associated with the respective device 120 or 130.

User device 110 may be a computing device configured to execute software instructions for performing operations consistent with the disclosed embodiments. In one embodiment, user device 110 may be a mobile device (e.g., tablet, smartphone, etc.), a desktop computer, a laptop, a server, a wearable device (eyeglasses, a watch, etc.), and/or device dedicated hardware device. User device 110 may include one or more processors configured to execute software instructions stored in memory, such as memory included in user device 110. User device 110 may include software that, when executed by a processor, performs known Internet-related communication and content display processes. For instance, user device 110 may execute browser software that generates and displays interface screens including content on a display device included in, or connected to, user device 110. The disclosed embodiments are not limited to any particular configuration of user device 110. For instance, user device 110 may be a mobile device that stores and executes mobile applications that provide financial-service-related functions offered by a financial service provider, such as an application associated with one or more financial accounts that a user (e.g., user 112) holds with a financial service provider. User 112 may enter and store user or customer preferences pertaining to applicable spending recommendations on user device 110. For example, user 112 may select categories of merchants or a specific merchant associated with the spending recommendations. Additionally, the spending recommendations may be an alert in a transmitted notification sent to user device 110 from financial service provider device 130 and/or merchant device 120. The alert may notify user 112 that they are approaching a merchant from a category of merchants or specific merchant previously selected by user 112. For example, the alert may be sent when user 112 is within a predetermined distance from the merchant. The distance could, for example, be a quarter mile or less, or alternatively, a much shorter distance, such as one city block or less. For example, the alert may notify user 112 that they are within one city block of a specific merchant previously selected by user 112.

Additionally, user 112 may enter and store user or customer preferences pertaining to applicable spending recommendations on user device 110. The preferences may include freezing a financial account of the user or customer when they are within a certain distance of a specific merchant or when they are on the specific merchant's premises. The preferences may also include a spending threshold associated with a specific merchant. For example, the preferences may include an alert notifying user 112 how much money they have spent relative to the spending threshold. The preferences may further specify that the financial account associated with user 112 may be frozen if user 112 exceeds the spending threshold.

In one embodiment, user 112 operates user device 110 to perform one or more operations consistent with the disclosed embodiments. In one aspect, user 112 may be a customer or potential customer of a merchant associated with merchant device 120. For instance, user 112 may transact business with the merchant associated with merchant device 120. In another aspect, user 112 may be a customer of a financial service provider associated with financial service provider device 130. For instance, the financial service provider may maintain a financial service account (e.g., checking account, credit account, or the like) for user 112.

Merchant device 120 may be associated with a provider of goods and/or services, such as a retailer or restaurant. Merchant device 120 may include one or more computing systems that are configured to perform computer-implemented processes, such as a server, desktop, laptop, mobile device, embedded system or other dedicated hardware. Further, merchant device 120 may include one or more computing devices configured to process and handle purchase transactions at a physical location of the associated merchant, such as point of sale terminals, local servers, kiosks, barcode scanners, etc., at a retail location. Merchant device 120 may be configured to perform financial transaction processes, such as receiving, processing, and handling purchase transactions, payment processes, etc., associated with the sale of goods and/or services provided by the associated merchant. In some aspects, merchant device 120 may include computing devices that include back- and/or front-end computing components that store user transaction data and execute software instructions to perform operations consistent with the disclosed embodiments, such as computers that are operated by employees of the associated merchant (e.g., back-office systems).

Financial service provider device 130 may be associated with a financial service provider. The financial service provider may be a bank, credit union, credit card issuer, or other type of financial service entity that generates, provides, manages, and/or maintains financial service accounts for one or more users (e.g., user 112). Financial service accounts may include, for example, checking accounts, and any other types of financial service accounts known to those skilled in the art. Financial service accounts may be associated with electronic accounts, such as a digital or virtual wallet or similar account that may be used to perform electronic transactions, such as purchasing goods and/or services online. Financial service accounts may also be associated with physical financial service account cards, such as a debit or credit card that user 112 may carry on their person and use to perform financial service transactions, such as purchasing goods and/or services at a point of sale terminal (e.g., merchant device 120).

The financial service provider includes infrastructure and components that are configured to generate and provide financial service accounts and financial service account cards (e.g., debit cards, credit cards). The financial service provider may also include infrastructure and components that are configured to manage transactions associated with a user service account. In certain aspects, financial service provider device 130 may include one or more computing devices configured to communicate with user device 110 and merchant device 120 via network 140 to execute processing steps associated with providing spending recommendations.

In certain aspects, the financial service provider associated with financial service provider device 130 may provide a primary financial service to a customer, e.g., user 112. For example, the financial service provider may maintain a credit card account with user 112, in a manner known in the art. In addition to the primary service (e.g., credit card account), the financial service provider may also provide additional services to user 112 to implement a user 112 actuatable spending recommendations. These additional services may include, for example, temporarily freezing a credit line associated with user 112, consistent with the user's instructions. The credit line may be frozen while user 112 remains in a merchant's premises. Consistent with disclosed embodiments, components of system 100 may cooperate over network 140 to provide a spending recommendation to user 112.

Network 140 may be any type of network configured to provide communications between components of system 100. For example, network 140 may be any type of network (including infrastructure) that provides communications, exchanges information, and/or facilitates the exchange of information, such as the Internet, a Local Area Network, near field communication (NFC), or other suitable connection(s) that enables the sending and receiving of information between the components of system 100. In other embodiments, one or more components of system 100 may communicate directly through a dedicated communication link(s) (not shown), such as a link between user device 110 and merchant device 120.

In some embodiments, user 112 associated with user device 110 may purchase goods and/or services from the merchant associated with merchant device 120. In some instances, user 112 may use a financial account provided by a financial service provider such as the financial service provider associated with device 130 to pay for the goods and or/services. In other instances, user 112 may use another payment method, such as cash.

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations of those described herein) will be apparent to persons skilled in the relevant art(s) based on the teachings contained herein. For example, merchant device 120 may include financial service provider device 130 for performing operations associated with a private label financial account provided by a merchant associated with merchant device 120. Such alternatives fall within the scope and spirit of the disclosed embodiments.

Figure 2:
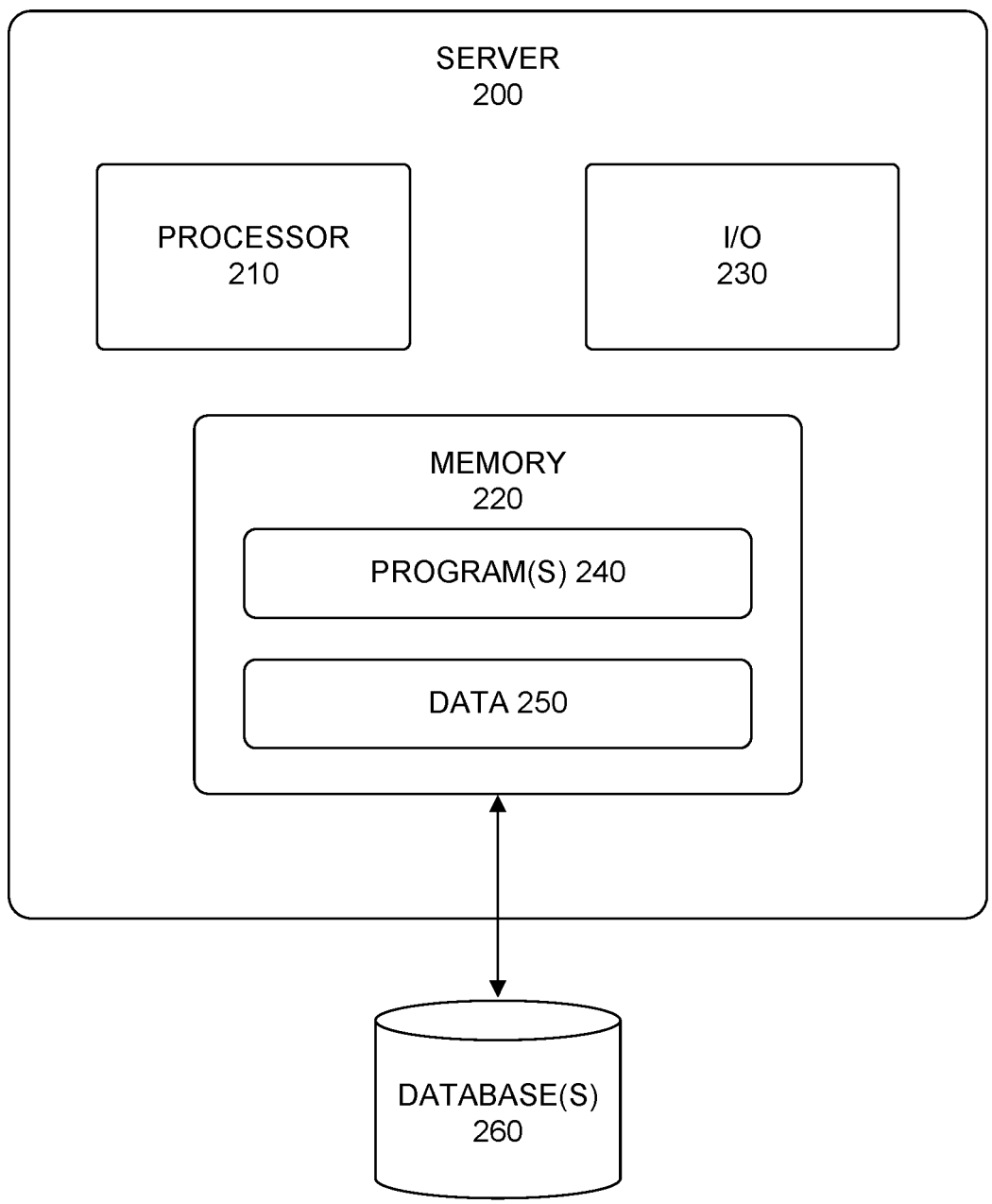
FIG. 2 is a block diagram of an exemplary server, consistent with disclosed embodiments.

FIG. 2 shows a block diagram of an exemplary server 200 for implementing embodiments consistent with the present disclosure. Variations of server 200 may be used by merchant device 120, and/or financial service provider device 130.

In one embodiment, server 200 includes one or more processors 210, one or more memories 220, and one or more input/output (I/O) devices 230. According to some embodiments, server 200 may be an embedded system or similar computing device that generates, maintains, and provides web site(s) consistent with disclosed embodiments. Server 200 may be standalone, or it may be part of a subsystem, which may be part of a larger system. For example, server 200 may represent distributed servers that are remotely located and communicate over a network (e.g., network 140) or a dedicated network, such as a LAN. Server 200 may correspond to any of merchant device 120 and financial service provider device 130.

Processor 220 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors. The disclosed embodiments are not limited to any type of processor(s) otherwise configured to meet the computing demands required of different components of server 200.

Memory 220 may include one or more storage devices configured to store instructions used by processor 210 to perform functions related to disclosed embodiments. For example, memory 220 may be configured with one or more software instructions, such as program(s) 240 that may perform operations when executed by processor 210. The disclosed embodiments are not limited to separate programs or computers configured to perform dedicated tasks. For example, memory 220 may include a single program 240 that embodies the functions of server 200, or program 240 could comprise multiple programs. Additionally, processor 210 may execute one or more programs located remotely from server 200. For example, user device 110, merchant device 120, and/or financial device 130, may, via server 200, access one or more remote programs that, when executed, perform functions related to certain disclosed embodiments. Memory 220 may also store data 250 that reflects any type of information in any format that server 200 may use in system 100 to perform operations consistent with the disclosed embodiments.

I/O device 230 may be one or more devices configured to allow data to be received and/or transmitted by server 200. I/O devices 230 may include one or more digital and/or analog communication devices that allow server 200 to communicate with other machines and devices, such as other components of system 100.

Server 200 may also be communicatively connected to one or more database(s) 260. Server 200 may be communicatively connected to database(s) 260 through network 140. Database 260 may include one or more memory devices that store information and are accessed and/or managed through server 200. By way of example, database(s) 260 may include Oracle™ databases, Sybase™ databases, or other relational databases or non-relational databases, such as Hadoop sequences files, HBase, or Cassandra. The databases or other files may include, for example, data and information related to the source and destination of a network request, the data contained in the request, etc. Systems and methods of the disclosed embodiments, however, are not limited to separate databases. In one aspect, system 200 may include database 260. Alternatively, database 260 may be located remotely from server 200. Database 260 may include computing components (e.g., database management system, database server, etc.) configured to receive and process requests for data stored in memory devices of database(s) 260 and to provide data from database 260.

Figure 3:
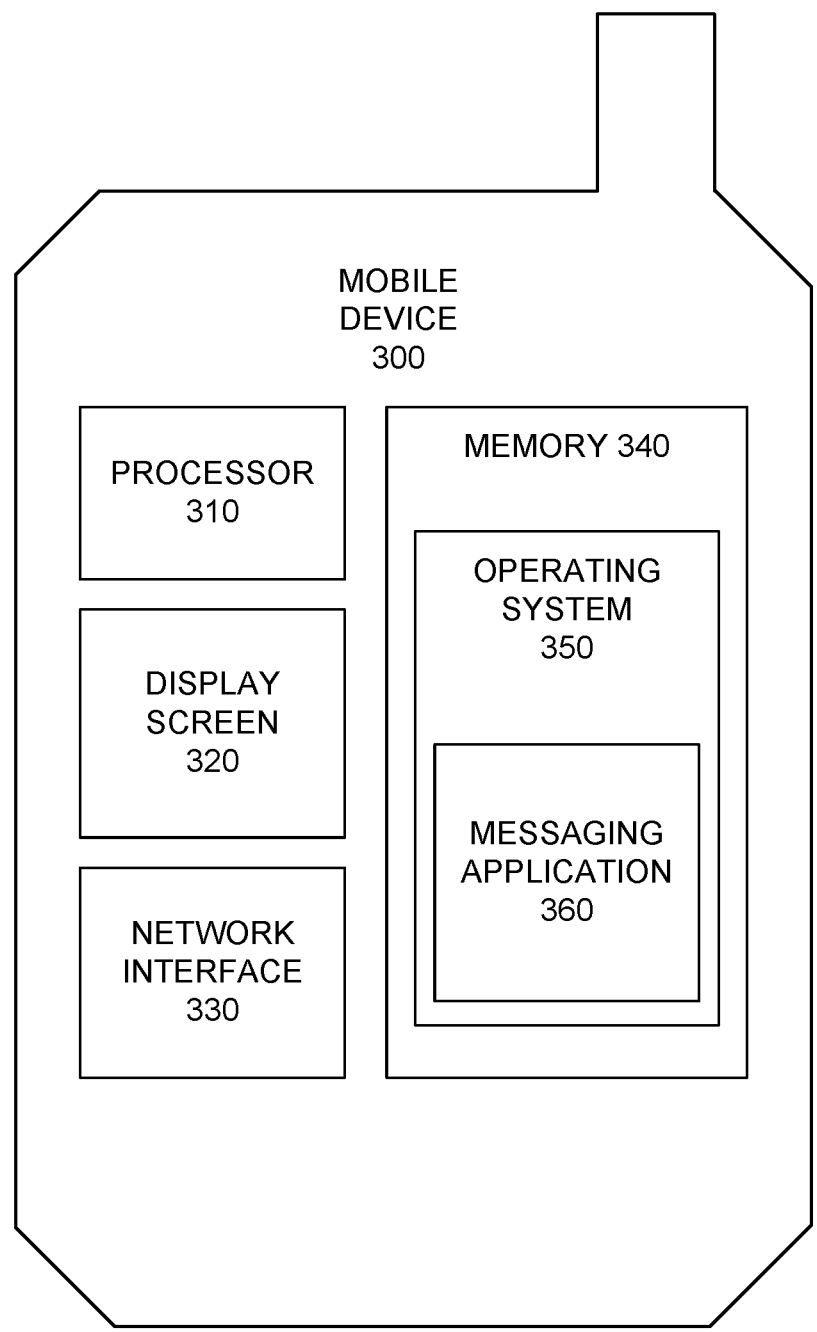
FIG. 3 is a block diagram of an exemplary user mobile device, consistent with disclosed embodiments.

FIG. 3 shows an exemplary block diagram of user device 110 for implementing embodiments consistent with the present disclosure. User device 110 may be a mobile device with computing capabilities, such as a tablet, a smartphone, or any combination of these devices and/or affiliated components. As shown, user device 110 includes one or more processors 310, a display screen 320, a network interface 330, one or more memory devices 340 storing one or more operating systems 350, and an inbuilt messaging application 360. Messaging application 360 may also be a stand-alone application residing in memory 340.

Display screen 320 may include, for example, a liquid crystal display (LCD), a light emitting diode screen (LED), an organic light emitting diode screens (OLED), a touch screen, or other known display screens. Display screen 320 may display various kinds of information consistent with disclosed embodiments.

Network interface 330 allows user device 110 to send and receive information through network 140. Alternatively, or in addition, network interface 330, may establish direct wired or wireless connection between user device 110 and other system components, such as server 200.

Memory 340 may be, for example, a magnetic, semiconductor, tape, optical, removable, non-removable, or other type of storage device or tangible (e.g., non-transitory) computer-readable medium. Memory 340 may store operating system 350, as well as data and mobile applications for performing operations consistent with functions described below.

Operating system 350 may perform known operating system functions when executed by processor 310. By way of example, the operating system may include Android™, Apple IOS™, Unix™, Linux™, or others. Accordingly, examples of the disclosed invention may operate and function with computer systems running any type of operating system having an inbuilt messaging application or interfacing with a stand-alone messaging application. Messaging application 360, when executed by processor 310, provides text messaging communication via network 140.

Figure 4:
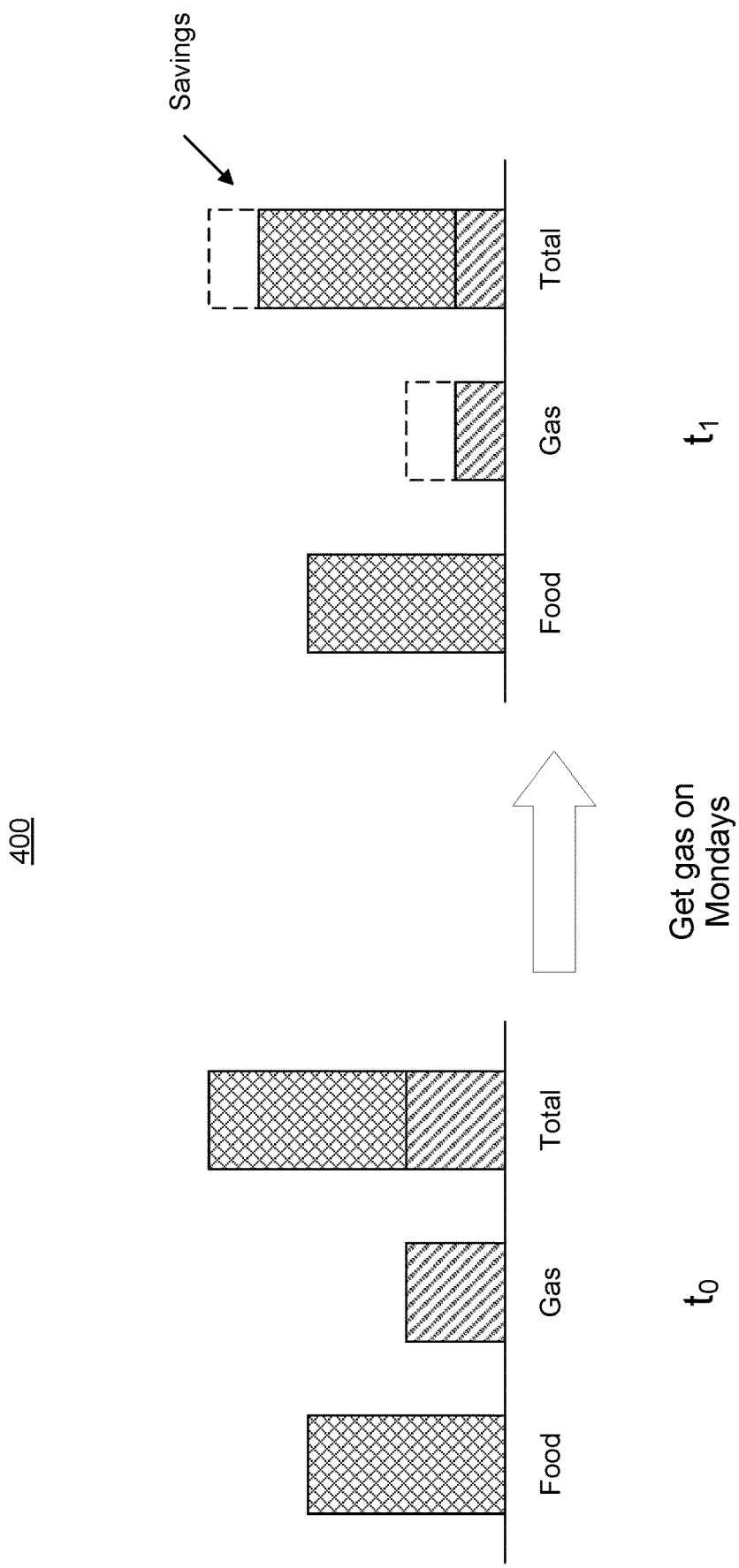
FIG. 4 is a block diagram of user spending and savings over a sample time period, consistent with disclosed embodiments.
Figure 5:
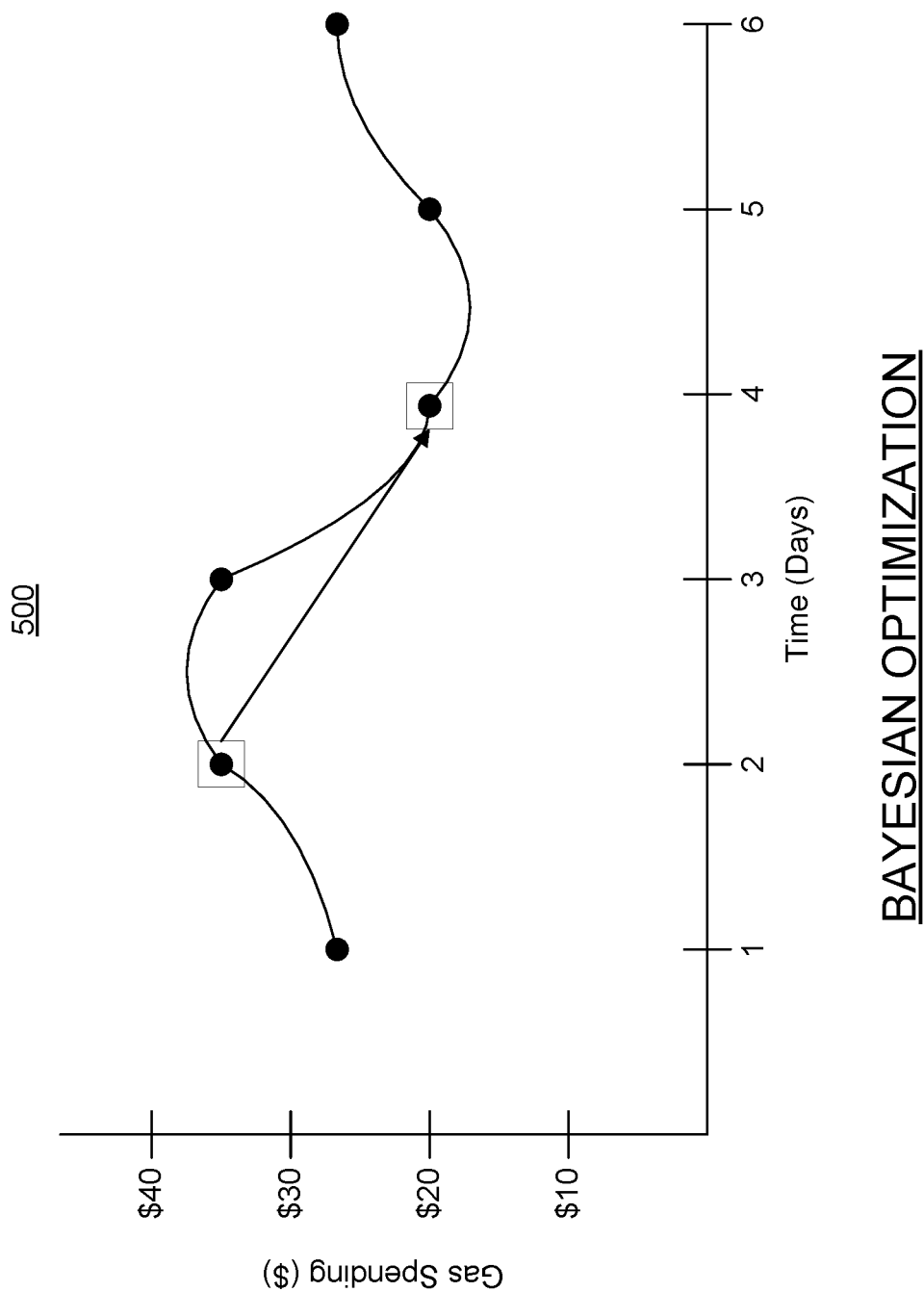
FIG. 5 is a directed graph illustrating a Bayesian optimization of user spending, consistent with disclosed embodiments.

FIG. 4 is a block diagram illustrating user spending and savings over a sample time period, consistent with disclosed embodiments. As shown in FIG. 4, block diagram 400 includes a bar graph illustrating a sample amount of money spent on food and gas at a first time $t_0$ and a sample amount of money spent on food and gas at a second time $t_1$. As shown in FIG. 4, when $t_1$ is a Monday, gas prices are lower, less money is spent on gas, and the total amount spent is less, illustrating a savings portion of the bar graph relative to first time $t_0$. In some embodiments, at least one of a temporal or a geographic spending trigger may be determined by extrapolating data from a directed graph, that is, a graph that includes vertices connected by edges associated with a direction. Consistent with this disclosure a directed graph, however, may also include a bar graph or Bayesian graph (including the bar graph as shown in FIG. 4 and Bayesian graph as shown in FIG. 5) and user spending patterns may be determined based on extrapolated data. While not shown, other types of graphs may be contemplated and used for extrapolating data to identify temporal or geographical spending triggers. Accordingly, based on extrapolation of data as shown in FIG. 4, financial service provider device 130 may indicate a personalized spending recommendation to "get gas on Mondays" prompting user 112 to purchase gas on Mondays in order to save money. This recommendation may be sent to user 112 on user device 110 over network 140 as part of a personalized spending recommendation, and may be made according to additional or updated data transmitted from merchant device 120.

FIG. 5 is a directed graph illustrating Bayesian optimization 500 of user spending, consistent with disclosed embodiments. FIG. 5 depicts a Bayesian optimization including a graph illustrating an amount of money spent on gas over a particular time period of days. While not shown, a Bayesian optimization may also include a graph illustrating an amount of money spent on gas within a particular distance to a target merchant (e.g., number of miles). As shown in FIG. 5, a sinusoidal-like shaped curve illustrates a fluctuation of spending purchases on gas relative to a length of time (number of days). For example, $35 may be spent on gas at 2 or 3 days from a particular starting time, but approximately $20 may be spent on gas after 4 days from a particular starting time. As shown in FIG. 5, a length of time measured in days is a temporal trigger for gas and food purchases of a user. Consistent with disclosed embodiments, at least one of a temporal or a geographic trigger may be determined by extrapolating data from the Bayesian graph, and user spending patterns may also be determined based on the extrapolated data. As shown in FIG. 5, spending data may be extrapolated and a personalized spending recommendation may instruct a user to wait 4 days before purchasing gas in order to pay a lower price for gas ($20). The personalized recommendation may also provide specific monetary amounts of spending associated with waiting a specific number of days.

Financial service provider device 130 may perform Bayesian optimization and may generate the directed graph shown in FIG. 5 consistent with model optimization. Financial service provider device 130 may include programs 240 at a server 200 including model optimizers, model storages stored in memory, data, data-searching systems, aggregation databases, data-migration systems, interfaces, client devices, computing environments, and/or databases. In addition, financial service provider device 130 may further include other components or devices not depicted that perform or assist in the performance of one or more processes, consistent with the disclosed embodiments.

In some embodiments, financial service provider device 130 may be configured to manage training of models, consistent with disclosed embodiments. Financial service provider device 130 may be configured to receive models and/or datasets from other components of server 200 or other components not shown (e.g., via user device 110), and may be configured to train models. Financial service provider device 130 may also be configured to generate models and/or corresponding generalized representations and may be configured to export models to other components of system 100 and/or to external devices used by server 200.

Financial service provider device 130 may be configured to generate models based on instructions received from a user or another system (e.g., via user device 110). For example, financial service provider device 130 may be configured to receive a visual (graphical) depiction of a machine-learning model and parse that graphical depiction into instructions for creating and training a corresponding neural network. Financial service provider device 130 may also be configured to select model training hyperparameters. This selection may be based on model performance feedback produced by a model optimizer during model training and/or received from another component of system 100. Financial service provider device 130 may be configured to provide trained models and descriptive information concerning the trained models to a model storage.

Financial service provider device 130 may be configured to train machine-learning models by optimizing model parameters and/or hyperparameters (hyperparameter tuning) using an optimization technique, consistent with disclosed embodiments. The optimization technique may include a grid search, a random search, a Gaussian process, a Bayesian process, a Covariance Matrix Adaptation Evolution Strategy (CMA-ES), a derivative-based search, a stochastic hill-climb, a neighborhood search, an adaptive random search, or the like. Tuning a hyperparameter may include iteratively selecting a hyperparameter and training model parameters using the hyperparameter until a training criterion is satisfied, consistent with disclosed embodiments. Bayesian optimization effectively searches the hyperparameter space while homing in optimal values. These optimization techniques may be utilized to determine and transmit optimal spending recommendations for display to user 112.

Figure 6:
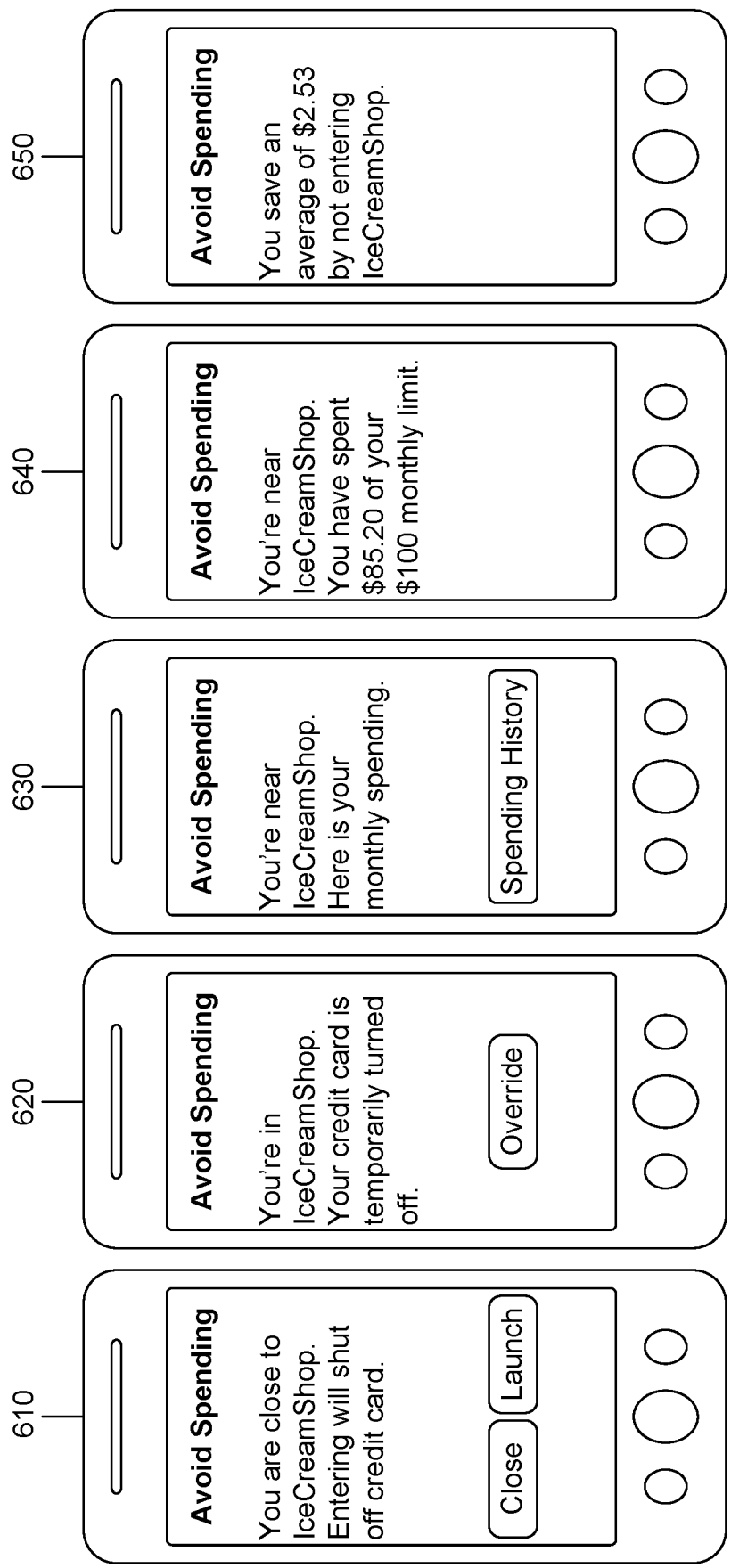
FIG. 6 depicts exemplary user device user interface displays of information relating to user spending, consistent with disclosed embodiments.

FIG. 6 illustrates exemplary user device user interface displays of information relating to personalized user spending recommendations, consistent with disclosed embodiments. FIG. 6 includes exemplary illustrations of graphical user interfaces (GUIs) on user device 110, displaying information, e.g., to user 112, consistent with disclosed embodiments, including information consistent with one or more of the spending recommendations. GUI 610 shows an exemplary user alert consistent with disclosed embodiments. As shown, GUI 620 includes an exemplary message informing user 112 that their credit card will be temporarily inactive while inside or near a target merchant. GUI 620 includes an exemplary message that informs user 112 of their ability to override the credit card freeze. GUI 630 includes an interactive menu and/or message prompts that allow user 112 to control user device 110 to work in conjunction with financial service provider device 130 to provide user spending history information. GUI 640 shows an exemplary user interface alerting user 112 to their preset monthly spending limit. GUI 650 shows an exemplary user interface informing user 112 of potential savings. Other GUIs illustrating other personalized messages may be contemplated, consistent with disclosed embodiments. As an example, GUI messages encouraging user 112 to spend money based on a temporal or geographic triggers may be contemplated.

Figure 7:
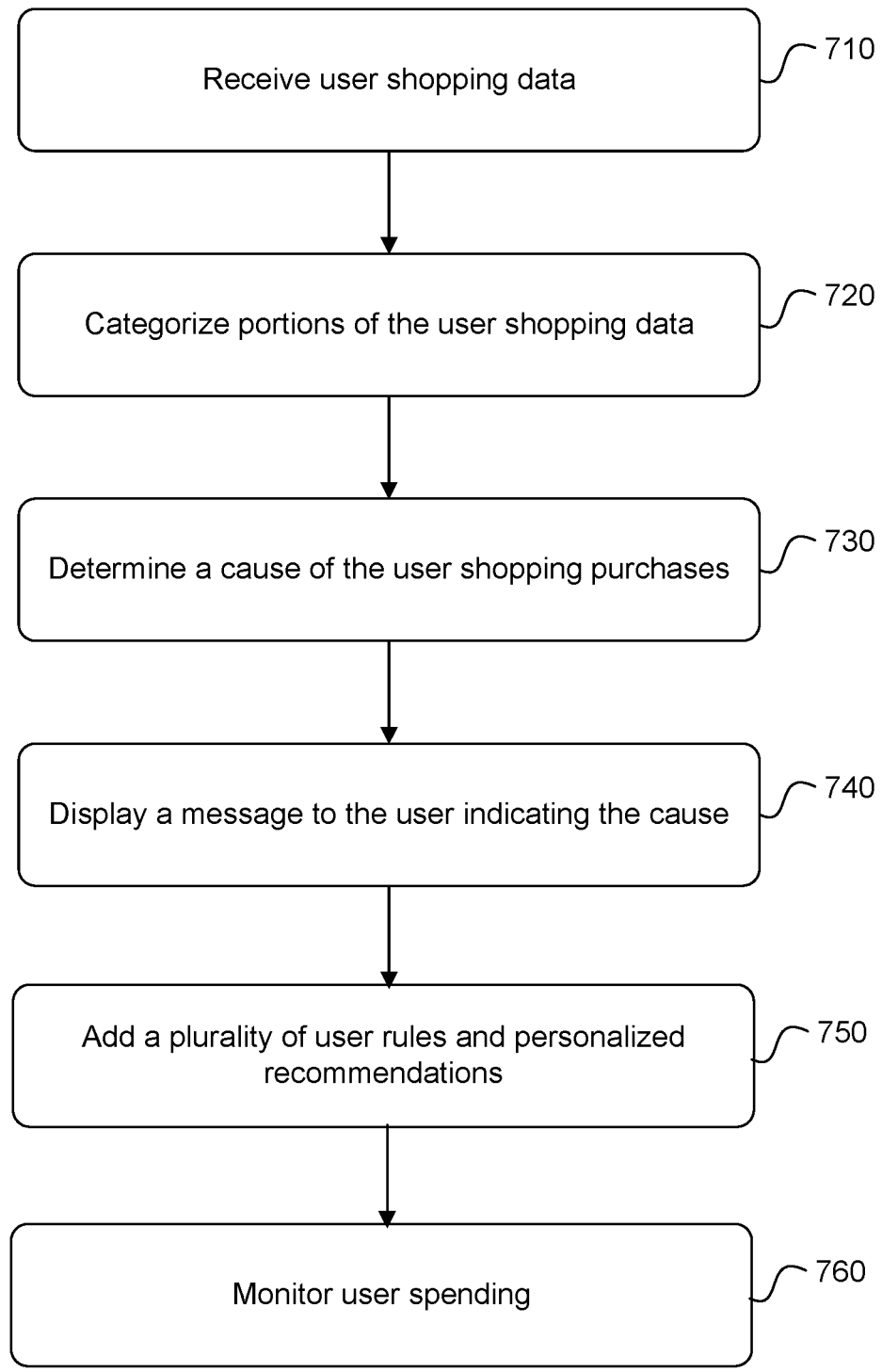
FIG. 7 depicts a flow chart of an exemplary process for providing spending recommendations to a user, consistent with disclosed embodiments.

FIG. 7 is a flowchart of an exemplary process 700 performed by the financial service provider device 130 for providing spending recommendations to a user consistent with embodiments of the present disclosure. In some aspects, spending recommendations may include advising user 112 to avoid making purchases near or inside a merchant's premises or on a particular day or time. In other aspects, spending recommendations may include an alert or notification transmitted to user device 110 consistent with the disclosed embodiments. It should be understood, however, that the disclosed embodiments are not limited to these types of spending recommendations or notifications, nor are they limited to being provided by a financial service provider 130. The exemplary disclosed embodiments may be applicable to any service provided to a user 112. In describing exemplary process 700, user 112 may or may not be a customer associated with user device 110.

At step 710, financial service provider device 130 may receive user shopping data based on a plurality of user shopping purchases over a finite time period. Financial service provider device 130 may receive data from user device 110 and/or merchant device 120 related to a user transaction over network 140. User 112 shopping transactions may be based upon prior personalized shopping (discussed at step 750) transmitted to user device 110 or may be made completely independent of any personalized recommendations. In some aspects, the received data may include information related to a potential transaction (pre-transaction data) and/or information related to a transaction that has already taken place (post-transaction data) with merchant device 120. Pre-transaction data may include a location of user device 110, which may be associated with the location of user 112 and a merchant or merchant's premises (e.g., a specific merchant previously selected by user 112), and/or information related to an item or service that is the subject of the potential transaction. For example, it may have been a long time since a particular food or grocery item (e.g., milk) may have been purchased last, and milk may be flagged as a potential transaction. Pre-transaction data may also include user data received from user device 110. Post-transaction data may include information about a transaction that previously occurred, which may be received from user device 110 and/or merchant device 120. For example, post-transaction data may include information from merchant device 120 regarding the purchase of a product by user 112 with a credit card maintained by a financial service provider associated with financial service provider device 130. Pre- and post-transaction data may also include a transaction history of user 112 with the merchant associated with merchant device 120 and also user preference data. Pre- and post-transaction data and user preference data may be stored in memory 220 as data 250 in database 260 of server 200 and may be retrieved at any time, consistent with disclosed embodiments. Along with pre- and post-transaction data, financial service provider device 130 may also receive a user-entered spending limit (e.g. no more than $100 a month on ice cream or wine).

At step 720, financial service provider device 130 may categorize portions of the received user shopping data by at least one of purchase quantity, purchase price, time of purchase, or total amount spent. For example, financial service provider device 130 may group all purchases including less than 10 items total into a category and may group all purchase prices under $2 into another category. Financial service provider device 130 may further group all purchases made on Sunday into a third category and may group total amounts spent under $10 into a fourth category. As an example, user 112 may purchase a single gallon of milk for $1.50 USD at a local grocery store on a Sunday morning. This transaction may be categorized in each of the foregoing groups. Other categorization schemes or predetermined thresholds may be contemplated.

For example, categorization schemes related to an identity of user 112 and financial account (e.g., credit card account) may be contemplated. In some aspects, financial service provider 130 may process the received data to determine the identity of user 112 and financial account (e.g., credit card account) associated with the user 112. For example, financial service provider device 130 may receive pre-transaction data from user device 110 indicating that user 112 is located near or is approaching (e.g., less than one mile) a specific merchant or category of merchants (e.g., ice cream shops or grocery stores) previously selected by user 112 or inside the specific merchant's premises. In some embodiments, financial service provider device 130 may execute software instructions to search database 260 to retrieve information that matches the received user shopping data, which may include user-identifying information, user preference data, financial account information, prior purchase quantities, prior purchase prices, prior times of purchase, and prior total amounts spent, consistent with disclosed embodiments.

At step 730, financial service provider device 130 may determine, based on a statistical model, at least one of a temporal or a geographic trigger for shopping purchases made by user 112. The statistical model may include a Bayesian model (as shown in FIG. 5) or any time of directed graph (as shown in both FIGS. 4 and 5). Other types of models may be contemplated. A temporal or a geographic trigger may include a time of day or a time during a week or month, and a geographical trigger may include a proximity to a merchant or merchant's premises or being physically located within a particular city or municipality. Other types of triggers may be contemplated based on user 112 behavior and transactional history of shopping purchases. For example, whenever a deposit is made into a user's bank account, at any time, financial service provider device 130 may determine that user 112 is more likely to spend money and make purchase transactions.

In some embodiments, a temporal, geographic, or other type of trigger may be determined based on at least one of Bayesian networks, Bayesian optimization, a Bayesian model, or artificial machine learning. A temporal, geographic, or other type of trigger may also be determined by extrapolating data from a directed graph and determining user 112 spending patterns based on the extrapolated data. Model parameters may be optimized and/or hyperparameters may be tuned (hyperparameter tuning) in order to determine one or more triggers operating simultaneously or independently using an optimization technique, consistent with disclosed embodiments.

In some embodiments, geographical trigger or location data may be determined by user device 110. For example, user device 110 may include a GPS device that provides geographic location information (not shown). In some embodiments, the GPS device may communicate with a GPS satellite navigation system that is used to determine the precise location of user device 110. The GPS device may decode time signal transmissions received from multiple satellites to determine the position of user device 110 using, for example, techniques performed by a processor executing software stored on a memory device within the GPS device. User device 110 may calculate and transmit geographic position information (e.g., location coordinates or the like) associated with user device 110 to financial service provider device 130.

In other embodiments, data received from user device 110 and/or merchant device 120 by the financial service provider device 130 may also include temporal trigger user data that allows financial service provider device 130 to determine the identity of user 112 associated with user device 110 based on a specific categorization of the data (at step 720). For example, user data may include login information associated with a specific login time (e.g., day and time) on a financial services application on a mobile device. In some embodiments, user data may identify the user's name, contact information, account information, etc. Additionally, the user data may include a merchant specific purchase transaction history associated with user 112 over a period of time. The merchant trigger may or may not be based solely on geographic parameters and may instead be based primarily on the goods or services it offers for sale, which may act as a trigger to user 112.

At step 740, financial service provider device 130 may display a message (as shown in FIG. 6) to user 112 indicating the trigger. The message may include user spending recommendations based on one or more of the identified triggers. For example, financial service provider device 130 may determine that the identified user is at or near a specific merchant (e.g., ice cream shops or grocery shop) and may transmit a message or notification to user device 110. As shown in FIG. 6, a notification may be determined from user preference data and may include a spending history of user 112 with the specific merchant (e.g., ice cream shops or grocery shop). For example, as shown in FIG. 6, the notification may include user 112's purchases with the specified merchant within the last week, month, or year, or may include an amount of a monthly limit already spent by user 112. Alternatively, as shown in FIG. 6, the notification may show user 112 their average purchase value associated with the specific merchant. User device 110 may obtain purchase information from the data of the account maintained by the financial service provider for user 112. As used herein, user 112 is located near a merchant or merchant's premises when the user is within at least one mile from the merchant's premises. User 112 may also be located near when user 112 is directly outside, one quarter mile or less, or one-half mile or less from the merchant's premises. Further, user 112 is located at the merchant or merchant's premises when user 112 is inside or within the merchant's premises.

In some aspects, the message or notification alerts user 112 of an action based on an identified trigger. For example, as shown in FIG. 6 in an embodiment in which the trigger constitutes purchases at a particular merchant, a temporary credit line freeze may be made, and financial service provider device 130 may send a notification to user device 110, which may be a mobile device, to alert user 112 of the credit freeze. The alert may be transmitted, for example, as an SMS text message, a push notification, an in-app notification, email, in substantially real time (i.e., before user 112 has made a purchase from the trigger merchant). As shown in FIG. 6, user 112 may "close" the message or may "launch" an application to see more about the credit freeze. The alert may notify user 112 of their proximity to a merchant specified by the user data (e.g., within a quarter mile). The alert may further notify user 112 that credit freeze will continue for a period of time if user 112 enters the trigger merchant's premise.

In other aspects, as shown in FIG. 6, the notification may inform user 112 of the option to override the credit freeze. For example, financial service provider device 130 may send a notification to user device 110 that includes an option to dismiss the credit freeze. The notification may also include information about the user's transaction history with the identified merchant. For example, if user 112 approaches a specific merchant, the notification may include the user's spending history with the specific merchant for the prior days, weeks, months, years, allowing user 112 to assess its purchases over time.

At step 750, financial service provider device 130 may add one or more spending recommendation rules to the statistical model based on direct user input. Financial service provider device 130 may also receive new user shopping data and new user behavior over a new time period and may modify the spending recommendation rules based on the new user shopping data and new user behavior. Financial service provider device 130 may also display a plurality of personalized spending recommendations, based on the new or updated spending recommendation rules. In some embodiments, user 112 may interact with user device 110 to provide additional user input. For example, user device 110 may receive input through an I/O device (e.g., touch screen, keypad,) and store the input as data transmitted to user device 110. The additional user input may include spending restrictions or associated spending recommendations as part of a notification sent from financial service provider device 130. For example, user 112 may decide that he or she no longer wants to spend any money or make any purchases at fast-food restaurants. As a result, user 112 may provide user input to indicating a spending recommendation based on a geographical trigger not to make any purchases whenever user 112 is determined to be in proximity of any fast food restaurant.

In some aspects, user input may include a prompt for adding new spending recommendation rules, such as the type of merchant or the name of a merchant at which a transaction may take place (e.g., fast food restaurants where purchases are allowed). In other aspects, the user input may include an indication of acceptance or refusal of the spending recommendation message after it is delivered to user 112. For example, user 112 may input to user device 110 an override button to be transmitted with the personalized spending recommendation to the user 112. The override button may dismiss the spending recommendation message. User input may be transmitted by user device 110 to financial service provider device 130.

It should be understood that new personalized spending recommendations based on new or updated rules according to user input may be transmitted to user device 110 from financial service provider device 130 and may be processed by user device 110 through a software program, such as a mobile application. User device 110 may execute software instructions to run the mobile application and present the information to user 112 in any manner. For example, user device 110 may store the information from financial service provider device 130 in an electronic database, and only display information when requested by user 112. Interactive menus and/or other selection tools may be provided by or via user device 110 to allow user 112 to decide what information is displayed, stored, transmitted.

In some embodiments, new personalized spending recommendations resulting from hard coded rules entered by user 112 as user input may be determined based on at least one of Bayesian networks, Bayesian optimization, a Bayesian model, or artificial machine learning. The new personalized spending recommendations may also be determined by extrapolating data from a directed graph and determining user 112 spending patterns in view of the new hard coded rules. Model parameters may be optimized and/or hyperparameters may be tuned (hyperparameter tuning) in order to determine and provide updated personalized spending recommendations using an optimization technique, consistent with disclosed embodiments.

At step 760, financial service provider device 130 may monitor the spending patterns of user 112 and may update personalized spending recommendations based on the spending patterns of user 112. In other embodiments, user 112 may want more specific information regarding their spending at a target merchant, which may require additional communication between user device 110 and financial service provider device 130. In these embodiments, financial service provider device 130 may receive additional spending information from user device 110 as a part of the monitoring process. The additional information may be related to possible transactions at a target merchant. For example, user device 110 may receive information about the spending history of user 112 at a target merchant. As a result of this new spending information, financial service provider device 130 may update spending recommendations according to Bayesian networks, Bayesian optimization, a Bayesian model, hyperparameter tuning, or artificial machine learning.

In some aspects, information about the user's transaction history may include a potential cost and/or cost savings to user 112. In some embodiments, financial service provider device 130 may execute software instructions to calculate cost savings available to user 112. As another example, financial service provider device 130 may monitor, as part of new rules and spending recommendations, whether user 112 is located in or near a target merchant. A target merchant may be a seller (e.g., a retailer associated with merchant device 120) that is identified as needing to be monitored. For example, when financial service provider device 130 becomes alerted to user 112 being in or near a fast-food restaurant, a notification may be made including information related to the user's shopping history at that particular fast-food restaurant, or at fast-food restaurants in general. The notification may include an action the user's credit line will be frozen until user 112 leaves the fast-food restaurant.

Financial service provider device 130 may be alerted that user 112 is at or near a target merchant through monitoring and, specifically, geo-fencing. Geo-fencing may include determining whether the user device 110 is located within a predetermined location boundary near the target merchant. In order to determine if user device 110 is within the predetermined boundary, user device 110 may determine its own location, which may be determined via GPS or other location-based measurements. In some aspects, user device 110 may send the location information, such as latitude-longitude coordinates, to financial service provider device 130. Financial service provider device 130 may process the received information to determine if user device 110 is within a particular predetermined boundary associated with any target merchants.

In some embodiments, financial service provider device 130 may be configured to monitor user spending and update machine-learning models by optimizing model parameters and/or hyperparameters (hyperparameter tuning) using an optimization technique, consistent with disclosed embodiments. The optimization technique may include a grid search, a random search, a Gaussian process, a Bayesian process, a Covariance Matrix Adaptation Evolution Strategy (CMA-ES), a derivative-based search, a stochastic hill-climb, a neighborhood search, an adaptive random search, or the like. Tuning a hyperparameter may include iteratively selecting a hyperparameter and training model parameters using the hyperparameter until a training criterion is satisfied, consistent with disclosed embodiments. Bayesian optimization effectively searches the hyperparameter space while homing in optimal values. These optimization techniques may be utilized based on monitored user spending to update and provide real-time optimal spending recommendations for display to user 112.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for providing spending recommendations to a user, the system comprising:
   at least one memory unit storing instructions; and
   at least one processor configured to execute the instructions to perform operations comprising:
      maintaining an account card service for an account associated with a first user;
      receiving first user shopping data based on a plurality of user shopping purchases over a first time period;
      determining, based on a Bayesian model, at least one of a temporal or a geographic trigger of the user shopping purchases by extrapolating data from a directed graph corresponding to the Bayesian model and determining user spending patterns based on the extrapolated data;
      displaying a message to the user indicating the trigger, wherein the message comprises a suggestion for a user spending recommendation based on the user spending patterns;
      adding a spending recommendation rule to the Bayesian model based on user input;
      displaying a personalized spending recommendation, based on the rule;
      temporarily freezing a credit line of an account card associated with the account card service based upon at least the trigger;
      displaying a message that informs the user of an ability to override a temporary freezing of the credit line;
      receiving second user shopping data and user behavior over a second time period; and modifying the rule based on the second user shopping data and user behavior.

2. The system of claim 1, wherein the operations further comprise categorizing the user shopping data by at least one of purchase quantity, purchase price, time of purchase, or total amount spent.

3. The system of claim 1, wherein the operations further comprise:
   monitoring the spending patterns of the user; and
   updating the personalized spending recommendation.

4. A computer-implemented method for providing spending recommendations to a user, the method comprising:
   maintaining an account card service for an account associated with a first user;
   receiving first user shopping data based on a plurality of user shopping purchases over a first time period;
   determining, based on a Bayesian model, at least one of a temporal or a geographic trigger of the user shopping purchases by extrapolating data from a directed graph corresponding to the Bayesian model and determining user spending patterns based on the extrapolated data;
   displaying a message to the user indicating the trigger, wherein the message comprises a suggestion for a user spending recommendation based on the user spending patterns;
   adding a spending recommendation rule to the Bayesian model based on user input;
   displaying a personalized spending recommendation, based on the rule;
   temporarily freezing a credit line of an account card associated with the account card service based upon at least the trigger;
   displaying a message that informs the user of an ability to override a temporary freezing of the credit line;
   receiving second user shopping data and user behavior over a second time period; and
   modifying the rule based on the second user shopping data and user behavior.

5. The method of claim 4, further comprising categorizing the user shopping data by at least one of purchase quantity, purchase price, time of purchase, or total amount spent.

6. The method of claim 4, further comprising:
   monitoring the spending patterns of the user; and
   updating the personalized spending recommendation.

7. A non-transitory computer-readable medium storing instructions that, when executed by a processor, cause the processor to perform operations comprising:
   maintaining an account card service for an account associated with a first user;
   receiving first user shopping data based on a plurality of user shopping purchases over a first time period;
   determining, based on a Bayesian model, at least one of a temporal or a geographic trigger of the user shopping purchases by extrapolating data from a directed graph corresponding to the Bayesian model and determining user spending patterns based on the extrapolated data;
   displaying a message to the user indicating the trigger, wherein the message comprises a suggestion for a user spending recommendation based on the user spending patterns;
   adding a spending recommendation rule to the Bayesian model based on user input;
   displaying a personalized spending recommendation, based on the rule;
   temporarily freezing a credit line of an account card associated with the account card service based upon at least the trigger;
   displaying a message that informs the user of an ability to override a temporary freezing of the credit line;
   receiving second user shopping data and user behavior over a second time period; and
   modifying the rule based on the second user shopping data and user behavior.

8. The computer-readable medium of claim 7, wherein the operations further comprise categorizing the user shopping data by at least one of purchase quantity, purchase price, time of purchase, or total amount spent.

* * * * *